C. C. HOLMAN.
Harvester.
No. 52,168. Patented Jan'y 23, 1866.
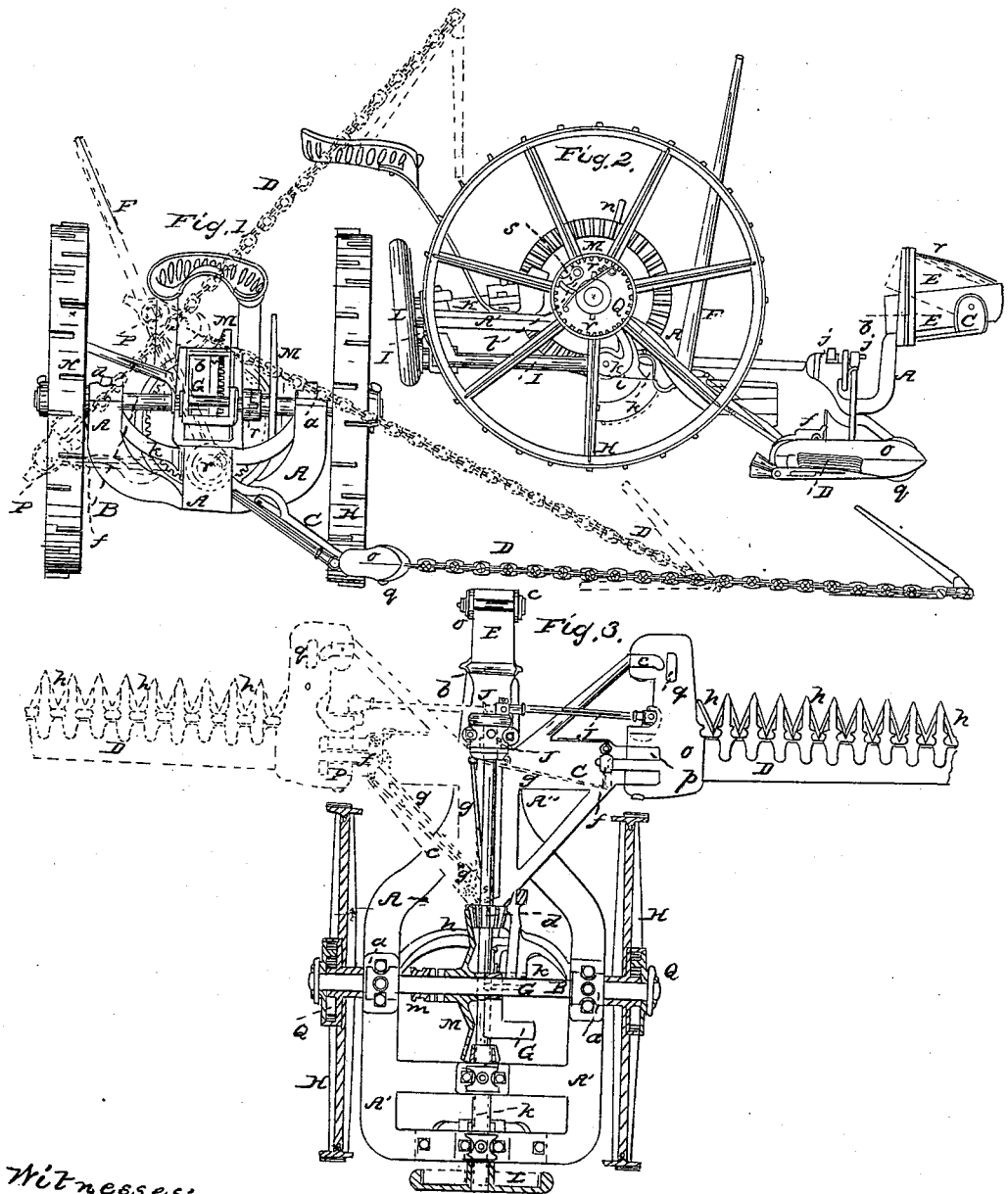

UNITED STATES PATENT OFFICE.

CHESTER C. HOLMAN, OF CLAYVILLE, NEW YORK.

IMPROVEMENT IN HARVESTERS.

Specification forming part of Letters Patent No. 52,168, dated January 23, 1866.

*To all whom it may concern:*

Be it known that I, CHESTER C. HOLMAN, of Clayville, in the county of Oneida, in the State of New York, have invented certain new and useful Improvements in Automatic Harvesters; and the following is a full, clear, and exact description of the same, reference being had to the accompanying drawings, making a part of this specification, in which—

Figure 1 represents a front-end view of the machine with the cutter-bar shown in various positions in red lines. Fig. 2 shows a side elevation of the same, the double-acting spring-pawl catches and internal cog or ratchet wheel being shown in red lines. Fig. 3 shows a plan or top view, with the cutter on the right, the cutter being reversed and shown on the left in red lines.

My invention consists in the construction of the main and brace frames for adapting them to adjusting and changing the cutting mechanism from the right to the left side of the harvester to operate by the will of the driver in his seat; also, in the form and construction of the near shoe and hinge for the cutter-bar; likewise in the manner of attaching the flexible pole to draw the machine.

My invention further consists in the double-acting spring-pawl catches and their place of operating to connect and disconnect the driving-wheels with the revolving axle and cutter-driving mechanism.

To enable others skilled in the art to make and use my improved automatic harvester, I will describe it more in detail, referring to the drawings and to the letters of reference marked thereon.

The frame A A may be made of cast or wrought iron, and suspended under the axle B, supported on the journal-boxes $a\ a$, so as to be nearly balanced, the rear part, A' A', being elevated to near the axle and in a plane with the surface of the ground, the forward portion of the frame A A being depressed so as to come near the surface where the two sides come together and form one solid bar, A'', which is extended forward a sufficient distance to allow the mounting of the connecting brace-frame C, which holds the cutting mechanism D D in position for operating either on the right or left side of the machine, the forward end of the frame A'' being turned up a suitable height and then projecting forward, it being provided with a square elongated loop or stirrup, $b\ b$, with ears $c\ c$ on its sides to secure the flexible pole E, for the team to be hitched to in working the harvester.

The connecting brace-frame C, with its concomitant parts—the bevel-pinion $d$, the segment-lever F, the spring-catch $f$, the cord or chain $g$, and the foot-lever G, by which the driver in his seat can control the action of the cutting mechanism so as to raise either the heel or point of the cutter over any elevation or obstruction and also to turn up the cutter-bar D and carry it over the frame A so that it will balance and be at rest in moving the machine to and from the field—I regard as an essential feature in my improved automatic harvester, the connecting brace-frame C being cast in one piece, and so formed that it works central with the crank-shaft I, to which the pitman J is connected to operate the cutting-blades $h\ h'\ h''\ h'''$, so that there is no cramping or binding of the cutters in any position they may be placed, the crank-shaft I having its journal-box $j$ in the same bearing at the forward end as the brace-frame C, whose bearing on the rear end is the bevel-pinion $d$, into which the segment-lever F connects to operate and control the cutting mechanism, the shaft I having a center bearing, $i$, in the cross-piece $k$, under the frame A' A', and another bearing at the rear of the frame.

On the rear end of the shaft I is the driving-pinion $l$, which connects with the inside spur-gear fly-wheel, L, on the counter-shaft K, which derives its motion from the bevel-gear wheel M on the axle B, which is thrown in and out of gear by an ordinary clutch-coupling, $m$, and cam-lever $n$.

The near shoe, O, which hinges the cutter-bar D to the connecting brace-frame C, I make in two pieces, they being concave, so that when they are put together they secure the cutter-bar firmly in its place and make the hinge P and $o$, on which it yields to the surface and holds in place the roller $q$ so that just sufficient surface protrudes on each side to carry the shoe smoothly over the field.

The near shoe being hollow, it is comparatively light, while it possesses the needed strength.

Thus it will be seen that by the construction and arrangement of the parts above described the driver in his seat has a perfect control of the cutting mechanism, and can elevate or depress either end of the cutter, can carry it at rest entirely away from any obstruction, can reverse the cutting mechanism and place it ready to operate on either the right or the left side of the harvester.

My mode of attaching the tongue or pole E, by putting the pin or bolt $e$ through it and the ears $c\ c$ forward of the loop or stirrup $b\ b$, makes it very rigid sidewise while it is in a condition to be depressed, and by the action of the spring $r$ on the top of the rear end the pole is made sufficiently flexible for practical purposes in passing the machine over short irregularities on the surface of the field.

My mode of connecting and disconnecting the driving-wheels H H with the axle B is to place over the hub, on the outside of the wheel, an internal spur-gear wheel, Q, into which a pawl, $s$, and spring $u$ is secured to the cap, the pawl having an arm or point, $t$, in such position that the spring $u$ will hold it either out or into the cogs or notches $v\ v$ of the wheel Q, the incline of the pawl being such that the cogs will move it on the spring and allow it to pass over when the wheel is turned back or in one direction, but holds in the cog and turns the axle when moved in the other direction on going forward. When the pawls $s\ s$ are thrown out of the notches $v\ v$, by pressing the pin $w$ toward the center of the axle the wheels H are free to turn on the arms of the axle without turning it or moving any of the working mechanism of the harvester.

It is conceded by all who have used the various kinds of reaping and mowing machines that great advantages are to be derived from a machine that will do the work both right and left, that can be easily reversed without loss of time or the driver being obliged to get off his seat, place the crank of the cutter-bar in a certain position, and then, by taking hold of the mechanism, lift it over by main strength or swivel it round. This seems to have been the *modus operandi* of all of the reversible harvesters that have ever come to my knowledge.

By my mode of construction and operation, as above described, it will readily be seen that in my improved automatic harvester the defects hitherto existing have been remedied, and a most complete reversible machine, that can be easily operated without loss of time, is made, so that instead of mowing around a field the work can as well or better be done by going back and forth on one side.

Having thus described my invention, what I claim as new, and desire to secure by Letters Patent, is—

1. The frame A A' A'', constructed as shown and described, and used in combination with the reversible brace-frame C and shoe O, as specified, whereby the cutting mechanism may be operated on either side of the machine, as herein described.

2. The connecting brace-frame C, with its pinion $d$, spring-catch $f$, cord or chain $g$, foot-lever G, and segment-lever F, arranged and operating in the manner and for the purposes specified.

3. The shoe O and roller $q$, constructed as described, in combination with the connecting brace-frame C and the cutting mechanism D, substantially in the manner and for the purpose herein set forth.

4. Attaching the pole or tongue E to the upright portion of the frame A, which is in advance of the brace-frame, by means of the lugs $c\ c$, pivot $e$, stirrup $b$, and spring $r$, arranged in the manner shown and described.

5. The employment of the converging spur-gear or ratchet wheel Q, with its pawl $s$, arm $t$, spring $u$, and pin $w$, arranged, as described, for connecting and disconnecting the driving-wheels with the working mechanism.

CHESTER C. HOLMAN.

Witnesses:
GEO. F. WALDRON,
P. R. MILLER.